July 4, 1950  C. A. REIMSCHISSEL  2,514,258
MULTIDIAMETER THREADING MECHANISM
Filed Feb. 19, 1944  3 Sheets-Sheet 1

Inventor
C. A. Reimschissel
By H. Yates Dowell
Attorney

July 4, 1950 C. A. REIMSCHISSEL 2,514,258
MULTIDIAMETER THREADING MECHANISM
Filed Feb. 19, 1944 3 Sheets-Sheet 2

Inventor
C. A. Reimschissel
By A. Yates Dowell
Attorney

July 4, 1950  C. A. REIMSCHISSEL  2,514,258
MULTIDIAMETER THREADING MECHANISM
Filed Feb. 19, 1944  3 Sheets-Sheet 3
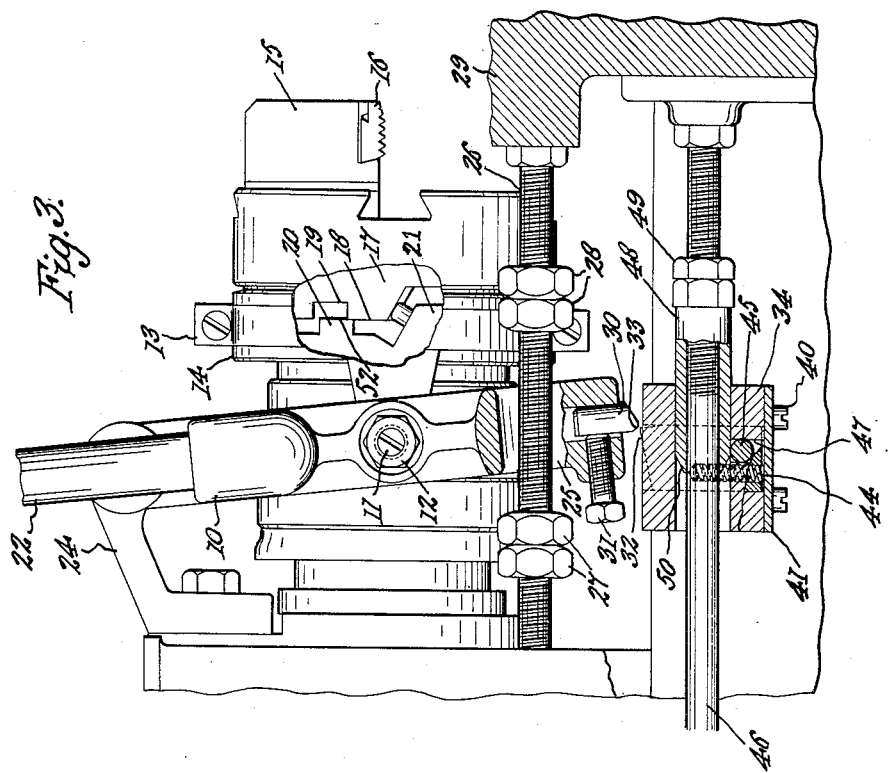
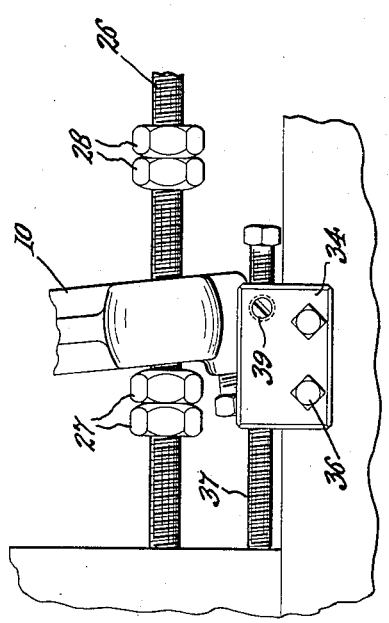
Inventor
C. A. Reimschissel
By A. Yates Dowell
Attorney Patented July 4, 1950

2,514,258

UNITED STATES PATENT OFFICE 2,514,258

MULTIDIAMETER THREADING MECHANISM

Charles A. Reimschissel, Waynesboro, Pa., assignor to Landis Machine Company, Waynesboro, Pa., a corporation of Pennsylvania Application February 19, 1944, Serial No. 523,139

12 Claims. (Cl. 10—95)

This invention relates to thread cutting machines and more particularly to thread cutting machines of the revolving die head type in which the opening and closing of the die head to set the cutting elements is accomplished manually by means of a yoke.

In certain industries, including aircraft, a need has arisen for a threaded member in the form of a stud or a bolt, for example, having two or more pitch diameters. As a result there has recently been developed a stud with the first two or three turns of the thread having a smaller pitch diameter than the remaining turns of the thread. This stud is extensively used in aircraft motors, for instance where the two or three turns of the smaller initial diameter enables easy insertion of the studs into tapped holes where wrench tightening is required.

With the provision of this stud has come the problem of production. In order to produce these studs by existing methods a single operation of the die head is required for each thread diameter, and therefore where two or more thread diameters are desired two or more settings of the die head are necessary. Production by this method is unsatisfactory since it is a repetition of effort, and consequently expensive, and also because it produces an abrupt change in the pitch diameter and creates an objectional circumferential ridge on the threaded stud.

It is an object of the invention to provide an outside control for a die head for altering the setting of the cutting elements to generate a thread of two or more distinct pitch diameters during one threading operation.

It is a further object of the invention to provide a control for the manually operated yoke of a threading machine so that the yoke may be automatically operated for setting the cutting elements to generate threads of two or more pitch diameters during one continuous threading operation.

A further object of the invention is to provide control mechanism of a character to produce adjustment of the cutting elements to obtain during a single cutting operation a transition between pitch diameters of any desired character from a gradual transition to a substantially instantaneous transition or sharp shoulder.

An object of the invention is to provide control mechanism for establishing a definite relationship between the length of the thread of both pitch diameters, and therefore the length of the thread of the greater pitch diameter or the interval between the successive openings of the die head.

A further object is to provide actuating means on the work holder for operating the control for causing the partial opening and later the full opening of the die head.

Another object of the invention is to provide control mechanism for a die head for producing settings of the threading mechanism for generating various combinations of thread lengths and pitch diameters without replacing parts of the structure.

A further object of the invention is to provide latch mechanism in conjunction with a die head which will permit the die head when threading to be partially opened to cut a thread of a larger pitch diameter.

A still further object of the invention is to provide means for mounting the latching mechanism on a conventional machine to enable the manufacture of these studs with the minimum of equipment.

Further objects and advantages will become apparent from the following specification taken in connection with the accompanying drawings, wherein:

Fig. 3 is a similar partial longitudinal section, showing the die head latched to produce a thread of the larger diameter;

Fig. 4 is an enlarged partial side elevation of the yoke mechanism;

Figure 1:
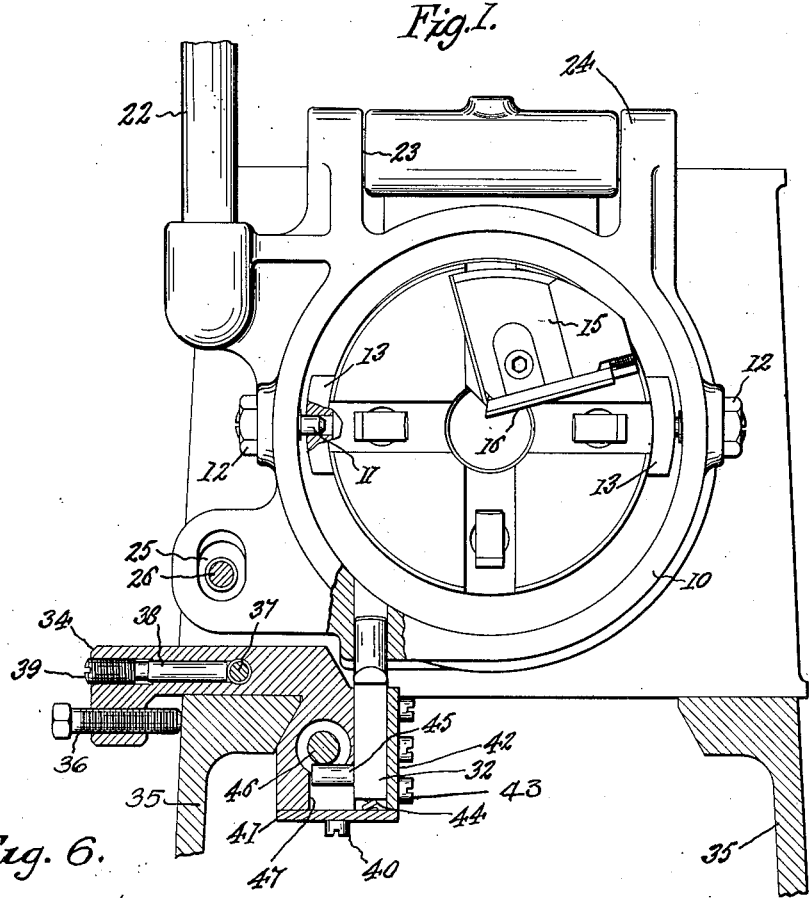
Fig. 1 is a face view or front end elevation of a threading die head with a partial section of the threading machine bed and the latching mechanism on the line 1—1 of Figure 2, showing the die head latched to produce a thread of the smaller pitch diameter.

Referring to the drawings wherein like reference characters indicate similar parts throughout the several views thereof, a yoke 10 is used to operate a die head of the character disclosed in U. S. Patent No. 2,082,757, issued to me June 1, 1937.

Figure 6:
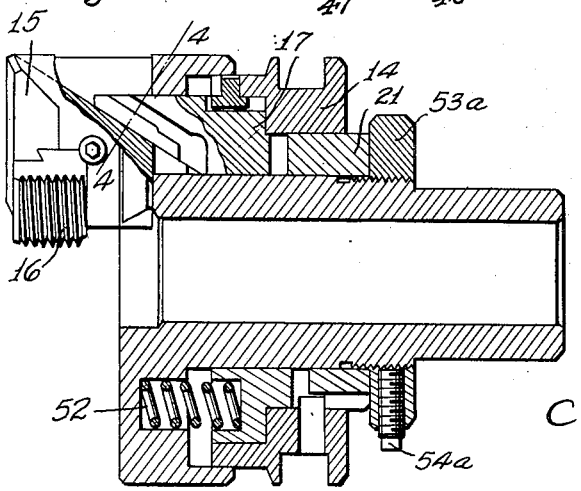
Fig. 6 is a longitudinal section.

The yoke 10 is pivotally attached by means of pivot screws 11 and nuts 12 to the yoke ring 13 which is seated in the annular groove of the operating ring 14, which, as described in the aforementioned patent, controls the radial position of chaser holders 15 and chasers 16. The details of this structure are shown more clearly in Fig. 6. As shown in this figure the body portion which carries the chaser holders is normally urged away from the closing ring by means of springs 52, the ends of which rest in sockets in these respective members. Likewise, the operating ring 14, has its forward edge abutting the rear edge of the closing ring. Also, the locking ring 21 is slidably received in the operating ring 14, and is adapted to be secured in adjusted position by a lock nut 53a, held in fixed position by a set screw 54a. A closing ring 17 contains, in its rear surface 18, slots 19 which receive projections 20 on the front surface of a locking ring 21 when the die head is open for withdrawal from the work. The yoke 10 is provided with a handle 22 for manual operation. A rod 23 about which the yoke 10 is pivoted is supported by a bracket 24 which in turn is attached to a stationary portion of the machine above the die head.

The yoke 10 also has an elongated opening 25 in which a trip rod 26 is located. The trip rod 26 is provided with abutments in the form of locking nuts 27, 28, Fig. 2, on each side of the opening in the yoke 10. With these nuts 27, 28 in the proper location the yoke 10 may be swung forwardly or rearwardly by longitudinal movement of the trip rod 26 attached to the carriage or work holder mechanism 29.

Figure 5:
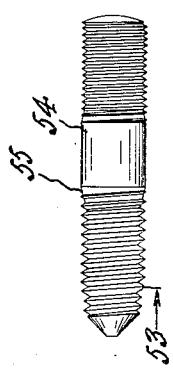
Fig. 5 is a side view of the finished product.

The yoke 10 is provided with a latch pin 30 adjustably retained in position by a screw 31. With the mechanism in latched position the latch pin or pawl 30, having a flat surface on one side, engages the top of a latch 32, and the yoke is held in a position determined by the location of the latch 32. The latch pawl 30 which engages the latch 32 is further provided with a beveled or curved surface 33 to insure a gradual operation of the latching mechanism in order to prevent an abrupt change in the diameter of the threaded portions of the work. The surface 33 may be varied to provide a configuration to determine the angularity of the joining portion between two portions of the threaded work. The less rounded or beveled the surface 33 the sharper the joint between the threaded portions of different diameters and vice versa. Therefore without any bevel the joint between the different diameters of the thread will be substantially a shoulder, while with the proper bevel or curvature there will be a gradual transition or joint between the different diameters of the thread of the work as shown in Fig. 5, later to be described.

A bracket 34 is fixed in a convenient manner to the base 35 of the threading machine where it is held in position by set screws 36. As shown in the drawings it may be supported by the ways of the machine, commonly used also to guide the carriage or work holding mechanism 29 toward the die head.

The bracket 34 is held in position longitudinally against the pressure of the yoke 10 by a screw 37, Fig. 4, which also serves as a means of fine adjustment of the position of the bracket 34. This bracket is further provided with a pin 38, Fig. 1, a set screw 39 for preventing the screw 37 from turning, or for locking it against rotation. The screw 39 may be loosened and the screw 37 turned to provide the necessary adjustment.

Attached to the base of the bracket 34 by screws 40 is a base plate 41 for supporting the latch 32. This latch is further retained in the bracket 34 by a side plate 42 attached to the bracket 34 by screws 43, thus the bracket 34, base plate 41 and side plate 42 form a rectangular opening or housing in which the latch 32 is free to move vertically. The latch 32 is provided with a recess in its base for a latch spring 44, which is normally compressed between the base plate 41 and the bottom of the recess in the latch 32, whereby the spring 44 serves to constantly urge the latch 32 upwardly. A pin 45 has one end embedded in the latch 32 and its other end extending outwardly from the side of the latch 32 so that when the die head is in fully closed position, as in Fig. 2, the pin rests against the latch trip rod 46 under the influence of the spring 44. The bracket 34 is provided with a slot 47 to allow for the free vertical movement of the pin 45. The latch trip rod 46 extends longitudinally through the bracket 34, and like the yoke trip rod 26 is fixed at one end to the work holding mechanism 29, and at its other end is supported by any convenient stationary part of the machine. The latch trip rod 46 is longitudinally threaded on its end attached to the work holding mechanism 29 in order to receive a tripping sleeve 48 and the nut 49. This threaded connection affords a simple means of adjusting the axial position of the tripping sleeve 48 on the trip rod 46. The tripping sleeve 48 has a beveled forward edge 50 which forms a cam surface for contact with the spring pressed pin 45, movement of the pin downwardly serving to retract the latch 32.

Figure 2:
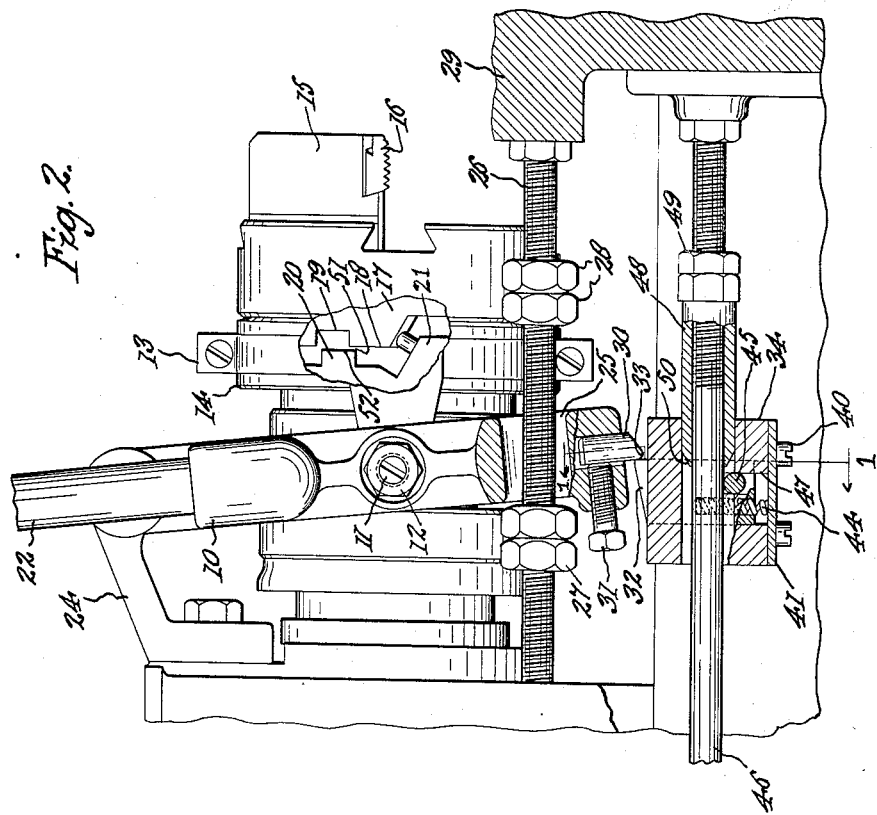
Fig. 2 is a partial longitudinal section showing the die head latched to produce a thread of the smaller pitch diameter.

Referring to Figs. 1 and 2, where the mechanism is shown in proper position for cutting the smaller diameter portion of the thread, latch bracket 34 and latch 32 are located in a manner to force the yoke 10 forward of its normal position when the die head is closed. By this means the yoke ring 13, operating ring 14 and closing ring 17 are all held in predetermined position forward of their normal positions when the die head is closed. In this position a space 51 is provided between the locking surfaces 18 and 52 of the closing ring 17 and the locking ring 21, respectively. Surfaces 18 and 52 are normally in contact when the die head is in threading position as seen in Fig. 3. The extreme forward position of the closing ring 17 results in the cutting elements 16 being held radially inwardly of the position they would normally occupy in closed condition.

In beginning the threading operation a work holder or work holding mechanism 29 is moved by well-known means toward the die head, or if desired the work holder may be stationary and the die head moved. As the work holder 29 is moved it carries with it the yoke trip rod 26 and the latch trip rod 46 and their associated parts including yoke tripping nuts 27, 28 on the tripping rod 26 and the tripping sleeve 48 on the latch tripping rod 46. This movement of the work holder and the tripping rods continues while the chasers or thread cutting elements are advanced from the end of the work to cut to a point 53 on the work 54 which is the termination of the small diameter thread, there being only a few turns of the same.

The latch tripping sleeve 48 has been adjusted on the latch tripping rod 46 so that when the work has advanced into the chasers or thread cutting elements of the die head to the point 53 on the work, the leading edge 50 of the sleeve 48 engages the pin 45 and depresses the same against the action of the spring 44. Since the pin 45 is secured to the latch 32 the latch is carried downward and is disengaged from the latch pawl 30. The head opening springs, 52 of the die head act to force the closing ring 17 rearwardly to its normally closed position so that the chasers or thread cutting elements are moved apart or radially outward in a position to cut a larger diameter in accordance with the setting of the latch mechanism. The latch mechanism is now in the condition shown in Fig. 3. The latch pawl 30 is disengaged from the latch 32, and the rectangular projection 20 of the locking ring 21 is in engagement with the rear surface 18 of the closing ring 17 and prevents its further rearward movement. The work holder 29 continues to carry the work 54 into the die head, and the remainder of the thread is cut on the larger diameter. When this operation has reached point 55 on the work 54, which point is the end of the desired thread, the yoke 10 is forced rearwardly by the tripping nuts 28, and the die head opens in the manner described in my Patent No. 2,082,757 above mentioned.

In order to reset the mechanism the work holder 29 is withdrawn from the die head along with the yoke tripping rod 26, latch tripping rod 46 and the tripping nuts and tripping sleeve. When the tripping sleeve 48 has been completely withdrawn from contact with the pin 45 the latch spring 44 acts to force the latch 32 upwardly until the pin 45 engages the trip rod 46. At the same time the yoke tripping rod which carries the tripping nuts continues to withdraw until the tripping nuts 27 force the yoke 10 forwardly to the position shown in Fig. 2 where the latch 32 again engages the latch pawl 30 and supports the yoke 10 in its original position.

While for simplicity of description and illustration only two pitch diameters have been illustrated and described, a multiplicity of the same may be obtained by the provision of additional latching mechanisms of a similar character, and where more than two pitch diameters are employed the joint between them may be varied accordingly.

It will be obvious to those skilled in the art that various changes in the invention may be made without departing from the spirit thereof, and the invention is not limited to that shown and described but only as indicated in the appended claims.

What is claimed is:

1. A die comprising a head, chasers carried by said head for motion from and toward an axis of said head, movable means carried by said head for simultaneously moving said chasers toward or away from said axis, means tending to move said moving means to chaser-open position with said chasers remote from said axis, a releasable latch associated with said head for holding said moving means in normal die-closed position, a second latch associated with said head for holding said moving means in a position beyond normal die-closed position wherein said chasers are positioned to cut the work under-size when said first-mentioned latch is in die-closed position, means acting upon said second latch for releasing said second latch after a predetermined extent of threading to permit said die to assume normal die-closed position, means acting on said first-mentioned releasable means for releasing said first-mentioned latch after a predetermined further extent of threading to permit said die to open, and means actuable to close said die to undersize cutting condition.

2. A die comprising a head, chasers carried by said head for motion from and toward an axis of said head, movable means carried by said head for simultaneously moving said chasers toward or away from said axis, means tending to move said moving means to chaser-open position with said chasers remote from said axis, a releasable latch associated with said head for holding said moving means in normal die-closed position, a second latch associated with said head for holding said moving means in a position beyond normal die-closed position wherein said chasers are positioned to cut the work under-size when said first-mentioned latch is in die-closed position, means acting upon said second latch for releasing said second latch after a predetermined extent of threading to permit said die to assume normal die-closed position, means acting on said first-mentioned latch for releasing said first-mentioned latch after a pre-determined further extent of threading to permit said die to open, means actuable to close said die to under-size cutting condition, and yielding means acting when said actuable means closes said die to position each of said latches in die-closed holding condition.

3. A die comprising a head, chasers carried by said head for motion from and toward an axis of said head, a member movably carried by said head and operatively connected to said chasers for simultaneously moving said chasers toward or away from said axis from one to another of three positions relative to said head, in the first of which positions said chasers are closed beyond normal die closed position in relation to cut undersized threads, in the second of which positions said chasers are in normally closed relation, and in the third of which positions said chasers are in die-open relation, and a pair of elements movably associated with said head for successive movement from inoperative positions as said die is threading a work piece, said die including mechanism actuated by such movement of the first of said elements to be moved during a threading operation, to move said member from said first position to said second position, and said die including mechanism actuated by such movement of the other of said elements after the movement of said first element, to move said member from said second position to said third position.

4. A multi-diameter threading mechanism comprising a frame, a die head rotatably mounted on said frame, radially movable chasers in said die head movable from a fully closed position to an intermediate position to a fully open position whereby threads having a plurality of pitch diameters may be cut, means in said die head for moving said chasers from said fully closed position to said intermediate position, means in said die head for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, an elongated opening in said yoke, a yoke trip rod slidably disposed in said opening and mounted on said work holder for movement therewith, adjustable stops on said yoke trip rod for moving said yoke in either direction, a pawl removably secured in said yoke, a bevelled latch engaging surface on said pawl, a latch block adjustably mounted on said frame, a latch member slidably mounted in said block, yieldable means in said block for urging said latch member to extended position, an opening through said block, a latch trip rod slidably disposed in said opening and mounted on said work holder for movement therewith, a cam sleeve adjustably mounted on said latch trip rod and engageable with a portion of said latch member to retract the same whereby upon movement of said yoke to close said chasers said pawl will engage said latch member and lock said chasers in fully closed position and upon movement of said work holder toward said die head will cut a thread of one pitch diameter, continued movement of said work holder engaging said cam sleeve with said latch member to retract the same and permit said yoke and chasers to move to intermediate position to cut a thread having a second pitch diameter, the angularity of said bevelled surface controlling the rate of transition between said threads, further movement of said work holder engaging one of said stops with said yoke to move said yoke and said chasers to fully open position and movement of said work holder away from said die head engaging said other stop with said yoke to move said yoke and said chasers to fully closed position and engaging said pawl with said latch member.

5. A multi-diameter threading mechanism comprising a frame, a die head rotatably mounted on said frame, chasers in said die head movable from a fully closed position to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, an elongated opening in said yoke, a yoke trip rod slidably disposed in said opening and mounted on said work holder for movement therewith, adjustable stops on said yoke trip rod for moving said yoke in either direction, a pawl removably secured in said yoke, a bevelled latch engaging surface on said pawl, a latch block adjustably mounted on said frame, a latch member slidably mounted in said block, yieldable means in said block for urging said latch member to extended position, an opening through said block, a latch trip rod slidably disposed in said opening and mounted on said work holder for movement therewith, a cam sleeve adjustably mounted on said latch trip rod and engageable with a portion of said latch member to retract the same whereby upon movement of said yoke to close said chasers said pawl will engage said latch member and lock said chasers in fully closed position and upon movement of said work holder towards said die head will cut a thread of one pitch diameter, continued movement of said work holder engaging said cam sleeve with said latch member to retract the same and permit said yoke and chasers to move to intermediate position to cut a thread having a second pitch diameter, the angularity of said bevelled surface controlling the rate of transition between said threads, further movement of said work holder engaging one of said stops with said yoke to move said yoke and said chasers to fully open position and movement of said work holder away from said die head engaging said other stop with said yoke to move said yoke and said chasers to fully closed position and engaging said pawl with said latch member.

6. A multi-diameter threading mechanism comprising a frame, a die head rotatably mounted on said frame, chasers in said die head movable from a fully closed postion to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, a yoke trip rod mounted on said work holder for movement therewith, adjustable stops on said yoke trip rod for moving said yoke in either direction, a pawl removably secured in said yoke, a bevelled latch engaging surface on said pawl, a latch block adjustably mounted on said frame, a latch member slidably mounted in said block, yieldable means on said block for urging said latch member to extended position, an opening through said block, a latch trip rod slidably disposed in said opening and mounted on said work holder for movement therewith, a cam sleeve adjustably mounted on said latch trip rod and engageable with a portion of said latch member to retract the same whereby upon movement of said yoke to close said chasers said pawl will engage said latch member and lock said chasers in fully closed position and upon movement of said work holder toward said die head will cut a thread of one pitch diameter, continued movement of said work holder engaging said cam sleeve with said latch member to retract the same and permit said yoke and chasers to move to intermediate position to cut a thread having a second pitch diameter, the angularity of said bevelled surface controlling the rate of transition between said threads, further movement of said work holder engaging one of said stops with said yoke to move said yoke and said chasers to fully open position and movement of said work holder away from said die head engaging said other stop with said yoke to move said yoke and said chasers to fully closed position and engaging said pawl with said latch member.

7. A multi-diameter threading mechanism comprising a frame, a die head rotatably mounted on said frame, chasers in said die head movable from a fully closed position to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, a yoke trip rod mounted on said work holder for movement therewith, stops on said yoke trip rod for moving said yoke in either direction, a pawl removably secured in said yoke, a bevelled latch engaging surface on said pawl, a latch block adjustably mounted on said frame, a latch member slidably mounted in said block, yieldable means in said block for urging said latch member to extended position, a latch trip rod mounted on said work holder for movement therewith, a cam adjustably mounted on said latch trip rod and engageable with said latch member to retract the same whereby upon movement of said yoke to close said chasers said pawl will engage said latch member and lock said chasers in fully closed position and upon movement of said work holder towards said die head will cut a thread of one pitch diameter, continued movement of said work holder engaging said cam with said latch member to retract the same and permit said yoke and chasers to move to intermediate position to cut a thread having a second pitch diameter, the angularity of said bevelled surface controlling the rate of transition between said threads, further movement of said work holder engaging one of said stops with said yoke to move said yoke and said chasers to fully open position and movement of said work holder away from said die head engaging said other stop with said yoke to move said yoke and said chasers to fully closed position and engaging said pawl with said latch member.

8. A multi-diameter threading mechanism comprising a frame, a die head rotatably mounted on said frame, chasers on said die head movable from a fully closed position to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, a yoke trip rod mounted on said work holder for movement therewith, stops on said yoke trip rod for moving said yoke in either direction, a latch engaging pawl removably secured in said yoke, a latch block adjustably mounted on said frame, a latch member slidably mounted on said block, a latch trip rod mounted on said work holder for movement therewith, a cam adjustably mounted on said latch trip rod and engageable with said latch member to retract the same whereby upon movement of said yoke to close said chasers said pawl will engage said latch member and lock said chasers in fully closed position and upon movement of said work holder toward said die head will cut a thread of one pitch diameter, continued movement of said work holder engaging said cam with said latch member to retract the same and permit said yoke and chasers to move to intermediate position to cut a thread having a second pitch diameter, further movement of said work holder engaging one of said stops with said yoke to move said yoke and said chasers to fully open position and movement of said work holder away from said die head engaging said other stop with said yoke to move said yoke and said chasers to fully closed position and engaging said pawl with said latch member.

9. A multi-diameter threading mechanism comprising a frame, a die head rotatably mounted on said frame, chasers in said die head movable from a fully closed position to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, a yoke trip rod mounted on said work holder for movement therewith, stops on said yoke trip rod for moving said yoke in either direction, latch engaging means on said yoke, a latch block adjustably mounted on said frame, a latch member slidably mounted in said block, a latch trip rod mounted on said work holder for movement therewith, a cam adjustably mounted on said latch trip rod and engageable with said latch member to retract the same whereby upon movement of said yoke to close said chasers said latch engaging means will engage said latch member and lock said chasers in fully closed position and upon movement of said work holder toward said die head will cut a thread of one pitch diameter, continued movement of said work holder engaging said cam with said latch member to retract the same and permit said yoke and chasers to move to intermediate position to cut a thread having a second pitch diameter, further movement of said work holder engaging one of said stops with said yoke to move said yoke and said chasers to fully open position and movement of said work holder away from said die head engaging said other stop with said yoke to move said yoke and said chasers to fully closed position and engaging said latch engaging means with said latch member.

10. A multi-diameter threading mechanism comprising a frame, a die head rotatably mounted on said frame, chasers in said die head movable from a fully closed position to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, a yoke trip rod mounted on said work holder for movement therewith, stops on said yoke trip rod for moving said yoke in either direction, latch engaging means on said yoke, a latch member movably mounted on said frame, a latch trip rod mounted on said work holder for movement therewith, a cam adjustably mounted on said latch trip rod and engageable with said latch member to retract the same whereby upon movement of said yoke to close said chasers said latch engaging means will engage said latch member and lock said chasers in fully closed position and upon movement of said work holder toward said die head will cut a thread of one pitch diameter, continued movement of said work holder engaging said cam with said latch member to retract the same and permit said yoke and chasers to move to intermediate position to cut a thread having a second pitch diameter, further movement of said work holder engaging one of said stops with said yoke to move said yoke and said chasers to fully open position and movement of said work holder away from said die head engaging said other stop with said yoke to move said yoke and said chasers to fully closed position and engaging said latch engaging means with said latch member.

11. A multi-diameter threading mechanism comprising a frame, a die head rotatably mounted on said frame, chasers in said die head movable from a fully closed position to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, a yoke trip rod mounted on said work holder for movement therewith, stops on said yoke trip rod for moving said yoke in either direction, latch engaging means on said yoke, a latch member movably mounted on said frame, a latch trip rod mounted on said work holder for movement therewith, latch releasing means on said latch trip rod and engageable with said latch member to retract the same whereby upon movement of said yoke to close said chasers said latch engaging means will engage said latch member and lock said chasers in fully closed position and upon movement of said work holder toward said die head will cut a thread of one pitch diameter, continued movement of said work holder engaging said latch releasing means with said latch member to retract the same and permit said yoke and chasers to move to intermediate position to cut a thread having a second pitch diameter, further movement of said work holder engaging one of said stops with said yoke to move said yoke and said chasers to fully open position and movement of said work holder away from said die head engaging said other stop with said yoke to move said yoke and said chasers to fully closed position and engaging said latch engaging means with said latch member.

12. A multi-diameter threading mechanism comprising a frame, a die head rotatably mounted on said frame, chasers in said die head movable from a fully closed position to an intermediate position to a fully open position whereby threads having a plurality of pitch diameters may be cut, means for moving said chasers from said fully closed position to said intermediate position, means for retaining said chasers in said intermediate position, a yoke pivotally mounted on said frame, means connecting said yoke and the mechanism of said die head whereby upon movement of said yoke in one direction said chasers will be moved to fully closed position and upon movement in the opposite direction said chasers will be moved to fully open position, a work holder mounted on said frame for movement toward and from said die head, a yoke trip rod mounted on said work holder for movement therewith, stops on said yoke trip rod for moving said yoke in either direction, latch engaging means on said yoke, a latch member movably mounted on said frame, a latch trip rod mounted on said work holder for movement therewith, latch releasing means on said trip rod and engageable with said latch member to retract the same whereby upon movement of said yoke to close said chasers said latch engaging means will engage said latch member and lock said chasers in fully closed position and upon movement of said work holder toward said die head will cut a thread of one pitch diameter, continued movement of said work holder engaging said latch releasing means with said latch member to retract the same and permit said yoke and chasers to move to intermediate position to cut a thread having a second pitch diameter, further movement of said work holder engaging one of said stops with said yoke to move said yoke and said chasers to fully open position.

CHARLES A. REIMSCHISSEL.

REFERENCES CITED

The following references are of record in the file of this patent:

UNITED STATES PATENTS

| Number | Name | Date |
| --- | --- | --- |
| 875,043 | Borden | Dec. 31, 1907 |
| 903,209 | Lidke | Nov. 10, 1908 |
| 1,114,704 | Scott | Oct. 20, 1914 |
| 1,199,393 | Lidke | Sept. 26, 1916 |
| 2,026,471 | Hoelzel | Dec. 31, 1935 |
| 2,054,028 | Benninghoff | Sept. 8, 1936 |
| 2,082,757 | Reimschissel | June 1, 1937 |
| 2,267,506 | Olsen et al. | Dec. 23, 1941 |
| 2,291,919 | Reimschissel | Aug. 4, 1942 |
| 2,291,920 | Reimschissel | Aug. 4, 1942 |

FOREIGN PATENTS

| Number | Country | Date |
| --- | --- | --- |
| 1,296 | Great Britain | Apr. 8, 1873 |
| 289,627 | Great Britain | May 3, 1928 |